(12) United States Patent
Fushihara et al.

(10) Patent No.: US 7,172,520 B2
(45) Date of Patent: Feb. 6, 2007

(54) GOLF BALL

(75) Inventors: Kazuhisa Fushihara, Kobe (JP); Koichi Fujisawa, Kobe (JP)

(73) Assignee: SRI Sports Limited, Kobe (JP)

( * ) Notice: Subject to any disclaimer, the term of this patent is extended or adjusted under 35 U.S.C. 154(b) by 5 days.

(21) Appl. No.: 10/318,239

(22) Filed: Dec. 13, 2002

(65) Prior Publication Data
US 2003/0114251 A1 Jun. 19, 2003

(30) Foreign Application Priority Data
Dec. 14, 1920 (JP) ............................ 2001-381499

(51) Int. Cl.
A63B 37/06 (2006.01)
(52) U.S. Cl. .................................... 473/374
(58) Field of Classification Search ................ 473/351, 473/376, 377, 373, 374
See application file for complete search history.

(56) References Cited

U.S. PATENT DOCUMENTS

| | | | |
|---|---|---|---|
| 4,338,413 A | * | 7/1982 | Coran et al. ................. 525/179 |
| 5,120,791 A | * | 6/1992 | Sullivan ...................... 525/196 |
| 5,238,997 A | * | 8/1993 | Bauer et al. .................... 525/66 |
| 5,716,293 A | | 2/1998 | Yabuki et al. |
| 5,935,021 A | | 8/1999 | Kashiwagi et al. |

FOREIGN PATENT DOCUMENTS

| | | |
|---|---|---|
| JP | 59-91973 A | 5/1984 |
| JP | 62-64378 A | 3/1987 |
| JP | 63-9461 A | 1/1988 |
| JP | 1-223980 A | 9/1989 |
| JP | 6-319832 A | 11/1994 |
| JP | 10-179802 A | 7/1998 |
| JP | 10-225532 A | 8/1998 |

OTHER PUBLICATIONS

Shinji Yamamoto, Hiroshi Sato, Kazuyoshi Fujii, and Koji Ishiguchi, Development of a Microdispersion-Type Ultrafine Fiber-Reinforced Composite Prepared from a Rubber-Polyolefin-Nylon Ternary Graft Copolymer, 1997. (Translation).*
Yamamoto et al., Nihon Reoroji Gakkaishi, vol. 25, No. 5, (1997), pp. 275-282.

* cited by examiner

Primary Examiner—Raeann Gorden
(74) Attorney, Agent, or Firm—Birch, Stewart, Kolasch & Birch, LLP

(57) ABSTRACT

A golf ball excellent in durability and feel is formed of a polymer compound containing a ternary composite formed of a rubber component, a polyolefin component and a nylon component. In particular, it is a golf ball formed of a core and a cover arranged to cover the core, the core being formed using a polymer compound containing a ternary composite formed of a rubber component, a polyolefin component and a nylon component, the polymer compound being formed of rubber, thermoplastic resin, thermoplastic elastomer, ionomer or a mixture thereof.

18 Claims, No Drawings

GOLF BALL

This nonprovisional application claims priority under 35 U.S.C. § 119(a) on Patent Application No. 2001-381499 filed in JAPAN on Dec. 14, 2001, which is herein incorporated by reference.

BACKGROUND OF THE INVENTION

1. Field of the Invention

The present invention relates to golf balls excellent in durability and feel at impact

2. Description of the Background Art

Conventionally, a golf ball having a thread-wound layer formed on a liquid center and a balata cover covering thereof has widely been used by advanced golfers and professional golfers as being excellent in shot feel and controllability. Since such a golf ball, however, has a structure that makes the manufacturing process complicated, and is poor in durability and resistance against abrasion, a variety of golf balls excellent in these characteristics as a whole have been developed.

In particular, an attempt to improve golf balls in durability is made by blending an increased amount of zinc acrylate, zinc methacrylate or any other similar co-crosslinker to provide an increased cross-linking density to absorb energy more effectively. On the other hand, feel at impact is improved by a proposed technique allowing a core to have a hardness profile flattened in the direction of the depth as seen from the surface. In this technique, it is hardened outward as seen from the center. The hardness, however, disadvantageously varies, and at impact a soft portion experiences stress-concentration, resulting in reduced durability.

Conventionally a variety of proposals have been made to generally improve various characteristics including durability and feel. Japanese Patent Laying-Open No. 59-91973, for example, proposes a golf ball having a solid core having a diameter of 36.0–38 mm, formed of rubber or resin containing at least 5 wt % of a carbon fiber, a silicon carbide fiber, or a boron fiber of 0.1 mm or more in length to improve the durability and feeling at the time of hitting.

Japanese Patent Laying-Open No. 62-64378 proposes a cover composition for a golf ball where a fine fiber having an amide group is blended in a cover material containing trans-polyisoprene as a main component to improve rebound property, spin property and cut resistance.

Japanese Patent Laying-Open No. 63-9461 proposes a cover composition for a golf ball where 5–42 parts by mass of trans-polybutadiene, 1–15 parts by mass of fine fiber having an amide group, and 5–30 parts by mass of natural rubber are blended in 100 parts by mass of a cover material containing trans-polyisoprene as a main component, as a cover material that realizes the best possible performance, that is, a flight distance of a multi-dimple type golf ball.

Japanese Patent Laying-Open No. 1-223980 proposes a thread-wound golf ball using a cover material where inorganic single crystal fibers are blended in a trans-1,4-polyisoprene-based cover material to improve a flight distance of the ball.

U.S. Pat. No. 5,716,293 discloses the use of a solid rubber center containing an oily material and a soft cover material to improve a shot feel and to increase a spin rate with a short iron as well. Since this technique uses an oil proof rubber or an ionomer resin having a high hardness for the outer side of the solid rubber center, the rebound performance and the shot feel is yet to be improved.

U.S. Pat. No. 5,935,021 proposes a technique to improve rebound property, durability and cut resistance by blending fibrous aluminum borate whiskers in a main material of a thermoplastic resin or a thermoplastic elastomer. This technique, however, reduces the rebound performance of the cover material by blending the aforementioned whiskers.

Japanese Patent Laying-Open No. 10-179802 proposes a golf ball where a base resin of a cover is formed of a two-component heated mixture, as a main component, of an ionomer resin and a styrene-butadiene-styrene block copolymer having a polybutadiene block containing an epoxy group or a styrene-isoprene-styrene block copolymer having polyisoprene block containing an epoxy group, characterized in that the composition forming the cover has a flexural modulus of 50–300 MPa and a Shore D hardness of 40–60. This technique is intended to improve the shot feel, the spin performance and the flight performance, but the cut resistance is still to be improved.

Japanese Patent Laying-Open No. 10-225532 proposes a cover composition for a golf ball formed of a resin composition in which aluminum borate whiskers are blended in a resin material made of an ionomer resin as a base material to improve durability.

Japanese Patent Laying-Open No. 6-319832 proposes a composition as a cover material formed by blending a core shell polymer made of (a) a core of a rubber-like polymer having an epoxy group or a carboxyl group or an acid anhydride group on the surface and (b) a shell of a glassy polymer, into an ethylene-unsaturated carboxylic acid copolymer, to improve a soft feeling and durability as well as rebound performance.

The Journal of the Society of Rheology, Japan, Vol. 25 (1997), pp. 275–282 has reported a development of a micro disperse system super-fine fiber reinforced composite prepared from a rubber-polyolefin-nylon ternary graft copolymer as an application of the plastic field.

These conventional techniques cannot improve the rebound performance, the spin performance, the cut resistance, durability, and feeling on the whole.

SUMMARY OF THE INVENTION

The present invention relates to a golf ball excellent in durability and feel at impact, which are issues with conventional solid golf balls.

The present invention is a golf ball formed of a polymer compound containing a ternary composite formed of a rubber component, a polyolefin component and a nylon component. Furthermore the present invention is a golf ball formed of a core and a cover arranged to cover the core, wherein the core is formed of a polymer compound containing a ternary composite formed of a rubber component, a polyolefin component and a nylon component.

The polymer compound includes a thermoplastic resin, a thermoplastic elastomer, an ionomer resin or a mixture thereof. Preferably 100 parts by mass of the polymer compound is mixed with 1 to 30 parts by mass of the ternary composite. Furthermore the present invention defines a golf ball having a core, an intermediate layer provided on the core, and a cover provided to cover the intermediate layer, wherein the core and/or the intermediate layer is formed from a polymer compound containing a ternary composite a rubber component, a polyolefin component and a nylon component.

The foregoing and other objects, features, aspects and advantages of the present invention will become more apparent from the following detailed description of the present invention.

DESCRIPTION OF THE PREFERRED EMBODIMENTS

The present invention defines a golf ball made of a polymer compound containing as a ternary composite a rubber component, a polyolefin component and a nylon component.

Ternary Composite

The ternary composite used in the present invention includes of three components i.e., a rubber component, a polyolefin component and a nylon component. These three components are chemically bound with each other to form a composite material where the fine nylon component is evenly distributed in a matrix of the rubber component and the polyolefin component.

The rubber component is limited to those which do not undergo gelation at a high temperature at the time of kneading and reaction with nylon and spinning, such as natural rubber, polyisoprene, ethylene-propylene-diene rubber (EPDM), nitrile-butadiene rubber (NBR), hydrogenated NBR (H—NBR). Ethylene-propylene-diene rubber (EPDM) is particularly suitable.

A low-density polyethylene, a high-density polyethylene, or polypropylene is used as the polyolefin component, and polypropylene is particularly preferable.

Nylon 6, nylon 66, nylon 11, nylon 12 is used as the nylon component. Nylon 6 is particularly preferable. The ratio of these combined components may be adjusted as appropriate depending on the required characteristics of the golf ball cover material. The ternary composite is developed by Ube Industries, is known under the trade name of SHP sold by Daiwa Polymer, and has the following grades according to the composition ratio:

PA3060:
  EPDM/PP/nylon 6=100/100/100;

HA1060:
  NR/HDPE/nylon 6=100/75/87;

LA1060:
  NR/LDPE/nylon 6=100/75/87;

LA3080:
  EPDM/LDPE/nylon 6=100/40/105;

LA5060:
  H—NBR/LPDE/nylon 6=100/100/100; and

Z040NB:
  NBR/LPDE/nylon 6=100/75/75 where NR is natural rubber, HDPE is a high-density polyethylene, LDPE is a low-density polyethylene, NBR is acrylonitrile-butadiene rubber, and H—NBR is a hydrogenated NBR. The composition ratio is expressed by parts by mass.

It is noted that the average diameter of the nylon fiber used in the ternary composite is normally not more than 10 µm and preferably in the range of 0.05–1 µm. In the matrix of the ternary composite, the polyolefin component (for example HDPE) forms a continuous phase.

The ternary composite (for example SHP) is normally manufactured in the following three steps:

(1) kneading and reaction of the rubber component and the polyolefin component;

(2) kneading and reaction of the rubber component, the polyolefin component and nylon; and (3) spinning.

First of all, the rubber, the polyolefin and a reaction agent are introduced in a closed kneader to obtain a kneading and reaction product. Here a sea-island structure is formed where the polyolefin is the sea and the rubber is the island. This kneading and reaction product as well as the nylon are fed into a twin-shaft extruder with a reaction agent to obtain a ternary graft polymer of rubber-polyolefin-nylon, that is, a ternary composite. By adjusting a graft rate, the nylon is evenly distributed in the rubber-polyolefin matrix, for example, as particles of 2–3 µm.

Thereafter the product is extruded from a nozzle installed at the end of the twin-shaft extruder and drawn with draft. Through this spinning step, the nylon particles in the extruded product strand are deformed and converted into a fiber-like product. The nylon fiber diameter is normally controlled in the range of 0.2–0.3 µm, in consideration of the productivity, depending on a draft ratio. Since the polyolefin phase forms the sea in these steps, the viscosity is reduced to enable pelletization.

It is noted that the ternary composite used in the present invention is manufactured based on the description in the Journal of the Rheology Society, Japan, Vol. 25 (1997) pp. 275–282, where the composition can be further adjusted.

Mixture of Polymer Component and Ternary Composite

In accordance with the present invention, the blended amount of the ternary composite is in the range of 1–30 parts by mass with respect to 100 parts by mass of the resin component described above. Preferably, it is 2–25 parts by mass, more preferably in particular 5–20 parts by mass. In this case, the content of nylon component included in the ternary composite affects the reinforcing effect of the polymer compound. If the blended amount of the ternary composite is less than one part by mass, the nylon short fiber has a less reinforcing effect. If the blended amount exceeds 30 parts by mass, the hardness of the polymer compound is increased and the elastic modulus is reduced.

Polymer Compound of Core or One-piece Ball

When the aforementioned ternary composite is blended into the present golf ball's core or one-piece-ball, a rubber compound typically containing a rubber component as a polymer component is used. The rubber compound is formed of a rubber vulcanizate. The rubber component suitably contains as a base material butadiene rubber having a cis-1,4-structure. It is noted that other than the aforementioned butadiene rubber, for example, natural rubber, styrene-butadiene rubber, isoprene rubber, chloroprene rubber, butyl rubber, ethylene-propylene rubber, ethylene-propylene-diene rubber, acrylicnitrile rubber can be blended by not more than 40 parts by mass.

In the rubber compound described above, a metallic salt of $\alpha,\beta$-ethylene unsaturated carboxylic acid produced by reacting the $\alpha,\beta$-ethylene unsaturated carboxylic acid such as acrylic acid or methacrylic acid with a metal oxide in the preparation of the rubber compound, or a metallic salt of the $\alpha,\beta$-ethylene unsaturated carboxylic acid such as zinc acrylate or zinc metacrylate, as well as a multi-functional monomer, N,N'-phenylbismaleimide, sulfur, and the like may be used as a cross-linking agent. Particularly, the metallic salt of the $\alpha,\beta$-ethylene unsaturated carboxylic acid is suitably used.

If the metallic salt of the $\alpha,\beta$-ethylene unsaturated carboxylic acid is used, for example, the blended amount thereof is preferably 10–40 parts by mass with respect to 100 parts by mass of the rubber component. On the other hand, if the α,β-ethylene unsaturated carboxylic acid is reacted with a metal oxide during the preparation of the rubber compound, the blended amount is preferably 15–30 parts by mass of α,β-ethylene unsaturated carboxylic acid and 15–35 parts by mass of the metal oxide such as zinc oxide with respect to the α,β-ethylene unsaturated carboxylic acid.

One or two or more kinds of inorganic powder of barium sulfate, calcium carbonate, clay, zinc oxide, and the like can be used as the filler used in the rubber compound described above. The blended amount of the filler is preferably in the range of 5–50 parts by mass with respect to 100 parts by mass of the rubber component. In addition, for the purpose of improving workability, hardness adjustment, and the like, a softener, a liquid rubber, and the like may be blended as appropriate. An antioxidant may be blended as appropriate.

An organic peroxide, for example, dicumyl peroxide, 1,1-bis(t-butyl peroxy)3,3,5-trimethylcyclohexane or the like is used as a cross-linking initiator. The blended amount of the cross-linking initiator is preferably 0.1–5 parts by mass, particularly 0.3–3 parts by mass with respect to 100 parts by mass of the rubber component.

In accordance with the present invention, the core or one-piece ball as described above may be of a single layer or of a multi-layer having different characteristics such as specific gravity and hardness. In this case, the formulation of the core is not limited to the formulation as described above.

Production of the Core

The core is produced typically using the aforementioned diene rubber as a polymer component. The diene rubber and the ternary composite, e.g., SHP are introduced into a closed kneader and kneaded. At that point, a kneading temperature has to be lower than a melting point of the nylon component in the ternary composite. If the temperature is higher than the melting point of the nylon component, the fiber is melted and the reinforcement by the fiber is lost. If the kneading temperature is lower than the temperature of the polyolefin, however, the ternary composite is not distributed in the rubber and remains in pellets. During this kneading, a phase transition of the polyolefin and the rubber takes place in the matrix, and the polyolefin is finely distributed in the rubber. The other blended agent is thereafter added and mixed, resulting in a core composition.

When the ternary composite is being mixed together or after it has been mixed, the blended agents as described above are mixed using a roll, a kneader, a Banbury, and the like and subjected to vulcanization using a mold under pressure at 145° C. to 200° C., preferably at 120° C. to 175° C. for 10–40 minutes. In order to attain a close contact with the cover, an adhesive may be applied to the surface of the resulting core, or the surface is processed to be coarse.

Core's Hardness Distribution

Golf balls which significantly compress and deform provide better feel at impact, and if golf balls uniformly compress and deform a golf ball having a hardness distribution with a larger difference provides better feel. More specifically, a core having a surface hardness (Hs) larger than a center hardness (Hc) with a difference in JIS-C hardness of 5 to 40, more preferably 10 to 35, allows further improved feel. Note that in measuring the JIS-C hardness, a core is divided in two and measured at 10 mm, 15 mm and 15 mm from the center, and preferably the core as seen in the cross section has hardness having a value increasing as seen from the center toward the surface.

Deformation of Core Under Compression

The core of the present invention has an amount of deformation under compression in the range of preferably 3.0 to 5.0 mm, particularly 3.2 mm to 4.5 mm under a load of 10 kg to 130 kg. If less than 3.0 mm, the shot feel tends to deteriorat. On the other hand, if more than 5.0, the rebound property is adversely effected.

Core Size

The diameter of a solid core is designed in the range of 36.8–41.4 mm, preferably 37.8–40.8 mm. If less than 36.8 mm, the thickness of the cover layer is increased and the rebound property is reduced. On the other hand, if more than 41.4 mm, the thickness of the cover layer is reduced and the molding becomes difficult.

Composition of Intermediate Layer

In the present invention an intermediate layer is formed using a polymer compound corresponding to the aforementioned rubber compound used for the core as well as thermoplastic resin, thermoplastic elastomer, ionomer resin or a mixture thereof.

The thermoplastic resin can be thermoplastic olefin resin, e.g., polyethylene, polypropylene, polystyrene, ABS resin, acrylic resin and methacryl resin, and furthermore polyamide resin, polyurethane resin, polyester resin.

The thermoplastic elastomer includes thermoplastic polyurethane elastomer, thermoplastic polyester elastomer, thermoplastic polyamide elastomer, and thermoplastic olefin elastomer.

The thermoplastic polyurethane elastomer is formed of a hard segment of a urethane structure and a soft segment of polyester or polyether. Listed as trade names are Miractran from Nippon Miractran Co., Ltd., Pandex from Dainippon Ink & Chemicals, Paraprene from Nippon Polyurethane Industry Co., Ltd., Pellethane from Dow Chemical Japan Limited, Elastollan from BASF Polyurethane Elastomers Ltd., Estan and Estaloc from Kyowa Hakko Kogyo, Iron Rubber from Nippon Mektron, Ltd., Resamine P from Dainichiseika C. & C. Mfg., Hi-prene from Mitsui-Nisso Urethane, Mobilon from Nisshinbo Industries, Kuramilon U from Kuraray Co., Ufine and Morthane from Asahi Glass Company, Sumiflex from Sumitomo Bakelite, ToyoboUrethane from Toyobo Co., Eagleran from Hokushin Corporation, and the like.

The thermoplastic polyester elastomer is formed of a hard segment of a polyester structure and a soft segment of polyether and polyester. Listed as trade names are Hytrel from Du Pont-Toray Co., Ltd., Pelprene P. S from Toyobo Co., Grilux E from Dainippon Ink & Chemicals, Lomod from GE Plastics Japan, Diaalloy R from Mitsubishi Rayon Co., Ltd., S-TPE from Sekisui Chemical Co., Ltd., ZTPE from Zeon Corp, Nubelan from Teijin Ltd., Flexsomer from Nippon Synthetic Chemical Industry Co., Ltd., Libellan from Nippon Miractran Co., Ltd., Primalloy from Mitsubishi Chemical Corporation, and the like.

The thermoplastic polyamide elastomer is formed of a hard segment of polyamide and a soft segment of polyether or polyester. Listed as trade names are Pebax from Toray Industries Ltd., Daiamid PAE from Daicel-Degussa Ltd., Grilux A from Dainippon Ink & Chemicals, Novamid PAE from Mitsubishi Engineering-Plastics Corporation, UBE-PAE from Ube Industries, Grilon ELX and Grilamid ELY from EMS Japan, S-TPAE from Sekisui Chemical Corporation, and the like.

The thermoplastic olefin elastomer is referred to as a concept including an olefin unit in a molecular chain, a so-called thermoplastic styrene elastomer, and includes a block copolymer having a soft segment and a hard segment in the molecule. The soft segment is a unit such as a butadiene block or an isoprene block containing a conjugated diene compound. As the conjugated diene compound, for example, one or two or more kinds can be selected from butadiene, isoprene, 1,3-pentadiene, 2,3-dimethyl-1,3-butadiene, and the like, and butadiene, isoprene and the combination thereof are particularly preferable among others. The component that forms a hard segment includes a polyethylene block, a polypropylene block or a styrene block. They are derived from ethylene, propylene, styrene, and a derivative of styrene, for example, a compound formed by selecting one or two or more kinds from α-methylstyrene, vinyltoluene, p-tertiary butylstyrene and the like.

The thermoplastic styrene elastomer includes, for example, a styrene-isoprene-butadiene-styrene block copolymer (SIBS structure), a styrene-butadiene-styrene block copolymer (SBS structure), styrene-ethylene-butylene-styrene block copolymer corresponding to the hydrogenated double bonded portion of the butadiene thereof (SEBS structure), styrene-isoprene-styrene block copolymer (SIS structure), styrene-ethylene-propylene-styrene block copolymer corresponding to the hydrogenated double bonded portion of that isoprene (SEPS structure), and a modified product thereof, and the like.

It is noted that the content of styrene (or the derivative thereof) in the aforementioned SIBS structure, SBS structure, SEBS structure, SIS structure, SEPS structure, and SEEPS structure is preferably in the range of 10–50% by weight, particularly 15–45% by weight in the copolymer. If the content is less than 10% by weight, the cover tends to be soft and have a reduced cut resistance. On the other hand, if the content is more than 50% by weight, the shot feeling and controllability cannot be maintained sufficiently.

In the present invention, it is possible to use a modified product which contains a functional group selected from an epoxy group, a hydroxyl group, an acid anhydride, and a carboxyl group in a part of the polymer chain of the aforementioned SIBS structure, SBS structure, SEBS structure, SIS structure, SEPS structure, and SEEPS structure.

For example, the styrene-butadiene-styrene block copolymer (SBS structure) having a polybutadiene block containing an epoxy group is a block copolymer having polystyrene at both terminal ends with an intermediate layer of polybutadiene containing the epoxy group, wherein a portion or all of the double bond of the polybutadiene portion may be hydrogenated. The styrene-isoprene-styrene block copolymer (SIS structure) having a polyisoprene block containing an epoxy group is a block copolymer having polystyrene at both terminal ends with an intermediate layer of polyisoprene containing the epoxy group, wherein a portion or all of the double bond of the polyisoprene portion may be hydrogenated.

A thermoplastic, epoxidized styrene elastomer having the epoxy group in the range of 200–3000 equivalent can be used. When such an epoxidized thermoplastic elastomer is mixed with the ionomer resin or the like, a reaction with the free carboxyl group of the ionomer resin occurs, resulting in a strong cover composition and a further improved cut resistance. If the epoxy group equivalent is less than 200 equivalent, the cut resistance is not so improved. On the other hand, if the epoxy group is more than 3000 equivalent, the reaction between the epoxy group and the free carboxyl group in the ionomer resin becomes excessive, resulting in a poorer flowability, which makes the ball molding difficult. The hydroxyl group, the acid anhydride and the carboxyl group are also introduced in the intermediate portion or the terminal end of the molecular chain of the block copolymer described above.

The ionomer resin is, for example, a binary copolymer of an α-olefin and an α,β-unsaturated carboxylic acid having 3–8 carbon atoms, that is produced by neutralizing at least a part of the carboxyl group with metal ion. Also listed is a ternary copolymer of an α-olefin, an α,β-unsaturated carboxylic acid having 3–8 carbon atoms, and an α,β-unsaturated carboxylate having 2–22 carbon atoms, that is produced by neutralizing at least a part of the carboxyl group with metal ion.

As to the composition ratio thereof, when the ionomer resin has a base polymer of a binary copolymer of an α-olefin and an α,β-unsaturated carboxylic acid having 3–8 carbon atoms, it is preferable that the α-olefin is 80–90% by weight and the α,β-unsaturated carboxylic acid is 10–20% by weight. When the base polymer is a ternary copolymer of an α-olefin, an α,β-unsaturated carboxylic acid having 3–8 carbon atoms, and an α,β-unsaturated carboxylate having 2–22 carbon atoms, it is preferable that the α-olefin is 70–85% by weight, the α,β-unsaturated carboxylic acid is 5–30% by weight, and the α,β-unsaturated carboxylate is not more than 25% by weight. These ionomer resins preferably have a melt index (MI) of 0.1–20, in particular of 0.5–15. The carboxylic acid content or the carboxylate content in the range as described above can improve the rebound property.

For example, ethylene, propylene, 1-butene, 1-pentene, or the like is used as the α-olefin described above, and ethylene is particularly preferable. For example, acrylic acid, methacrylic acid, fumaric acid, maleic acid, crotonic acid, or the like is used as the α,β-unsaturated carboxylic acid having 3–8 carbon atoms, and acrylic acid and methacrylic acid are particularly preferable. Acrylate, methacrylate, fumarate, maleate of methyl, ethyl, propyl, n-buthyl, isobutyl ester or the like is used as the unsaturated carboxylate, and acrylate and methacrylate are particularly preferable.

The metal ion for neutralizing at least a part of the carboxyl group in the copolymer of an α-olefin and α,β-unsaturated carboxylic acid, or the ternary copolymer of an α-olefin, an α,β-unsaturated carboxylic acid and an α,β-unsaturated carboxylate as described above is a sodium ion, a lithium ion, a zinc ion, a magnesium ion, a potassium ion, and the like.

When the ionomer resin is obtained by neutralizing at least a part of the carboxyl group in the copolymer of ethylene and acrylic acid or methacrylic acid, a so-called high-rigidity and high-flow type one is preferable with a melt index of 3–7 and a flexural modulus of 200–400 MPa.

The specific examples of the ionomer resin as described above are the ionomer resin of binary copolymer commercially available from Du Pont-Mitsui Polychemicals Co., Ltd. under the trade names of Hi-Milan 1555 (Na), Hi-Milan 1557 (Zn), Hi-Milan 1605 (Na), Hi-Milan 1706 (Zn), Hi-Milan 1707 (Na), Hi-Milan AM7318 (Na), Hi-Milan AM7315 (Zn), Hi-Milan AM7317 (Zn), Hi-Milan AM7311 (Mg), and Hi-Milan MK7320 (K). The ionomer resin of ternary copolymer includes Hi-Milan 1856 (Na), Hi-Milan 1855 (Zn), Hi-Milan AM7316 (Zn), and the like.

The ionomer resin commercially available from Du Pont includes Surlyn 8945 (Na), Surlyn 8940 (Na), Surlyn 9910 (Zn), Surlyn 9945 (Zn), Surlyn 7930 (Li), and Surlyn 7940 (Li), as well as Surlyn AD8265 (Na), Surlyn AD8269 and the like as the ternary copolymer type ionomer resin.

The ionomer resin commercially available from Exxon-Mobil Chemical Company includes Iotek 7010 (Zn), Iotek 8000 (Na), and the like. It is noted that Na, Zn, K, Li, Mg, and the like shown in the brackets after the trade names described above indicate the neutralizing metal ion species thereof. In the present invention, the ionomer resin used in the cover composition may be a mixture of two or more kinds of those illustrated above, or a mixture of two or more kinds of the ionomer resins neutralized with a bivalent metal ion and the ionomer resin neutralized with a monovalent metal ion as illustrated above.

Mixture of Two or More Types of Polymer Components

The intermediate layer's polymer component can be two or more types of thermoplastic resin or thermoplastic elastomer, ionomer resin that are mixed together by a ratio adjustable appropriately to correspond to the intermediate layer's required characteristics.

Process of Production of Intermediate Layer

In the present invention for the intermediate layer's polymer compound a rubber component as well as for example thermoplastic elastomer, thermoplastic resin or ionomer resin are used. These polymer materials and the ternary composite described above (for example SHP) were introduced into a closed kneader and kneaded. As has been described above, a kneading temperature has to be lower than a melting point of the nylon component in the ternary composite. If the temperature is higher than the melting point of the nylon component, the fiber is melted and the reinforcement by the fiber is lost. If the kneading temperature is lower than the temperature of the polyolefin component of the ternary composite, however, the ternary composite is not distributed in the rubber compound and remains in pellets. During this kneading, a phase transition of the polyolefin and the rubber takes place in the matrix, and the polyolefin is finely distributed in the rubber. The other blended agent is thereafter added and mixed, resulting in the intermediate layer's polymer compound.

Material for Cover

The present golf ball can be a one-piece ball as well as a two-piece ball formed of a core and a cover arranged to cover the core or a three-piece ball formed of a core, an intermediate layer outer than the core, and a cover arranged to cover them. The cover can be formed of the aforementioned thermoplastic resin, ionomer resin and/or thermoplastic elastomer, and further more a mixture thereof. Preferably, it can be formed of ionomer resin, thermoplastic polyurethane elastomer, polyester elastomer, thermoplastic olefin elastomer. Furthermore, it can be formed of two or more thereof that are mixed together. For example, ionomer resin and thermoplastic elastomer can be mixed together. For example for 100 parts by mass of ionomer resin no more than 50 parts by mass of thermoplastic elastomer can be mixed to provide improved spin performance and better feel.

The cover composition described above may be blended with a filler such as barium sulfate, a pigment such as titanium dioxide, a dispersant, an antioxidant, a ultraviolet absorber, a photo-stabilizer, a fluorescent material or a fluorescent brightening agent, and the like, as necessary, in such a range that cannot impair the desired characteristics of the golf ball cover.

Production of Golf Ball

In accordance with the present invention, the cover can be molded to a core using a known method. For example for a two-piece ball formed of a core and a cover the cover composition is formed into a semi-spherical half-shell in advance and the core is wrapped with two half-shells for pressure molding at 130–170° C. for 1–5 minutes. Alternatively, the cover composition described above may be injection-molded directly onto the core to wrap the core. The cover has a thickness of 0.3–3.5 mm, preferably 1.0–2.5 mm. If less than 0.3 mm, the cover is likely to crack when hit repeatedly. If more than 3.5 mm, the shot feeling becomes worse. Furthermore, at the time of molding the cover, a number of dimples are formed on the surface as necessary. The golf ball of the present invention is normally finished with paint, stamped with marking, etc. in order to improve the appearance to increase a market value for introduction in the market.

The golf ball of the present invention uses a thread-wound core, a single-layered or multi-layered solid core, and may be employed in either a thread-wound ball or a solid ball.

It is noted that in accordance with the present invention, the cover may be of a single layer or of a plurality of layers. The golf ball in accordance with the present invention is normally designed to have a diameter in the range of 42.67–43.00 mm and a weight in the range of 45.00–45.93 g.

The core of the present invention has the amount of deformation under compression in the range of preferably 2.0–4.0 mm, particularly 2.5 mm–3.5 mm under a load of 10 kg to 130 kg. If less than 2.0 mm, the shot feel tends to be deteriorated. On the other hand, if more than 4.0, soft feel is provided at impact and the rebound property is adversely effected.

EXAMPLE

Examples 1 and 2 and Comparative Examples 1–3

(1) Production of Core

As shown in Table 1, the core rubber compound using butadiene rubber as a base component and the ternary composite (SHP) were kneaded and hot-molded in a mold at 170° C. for 15 minutes (and furthermore at 165 degrees centigrade for 8 minutes for the third comparative example) for fabricating a ball-like solid core having a diameter of 38.5 mm. The resulting solid core has physical properties as shown in Table 1

TABLE 1

| | | ex. 1 | ex. 2 | ex. 3 | comp. ex. 1 | comp. ex. 2 | comp. ex. 3 |
|---|---|---|---|---|---|---|---|
| composition of core | BR18[1] | 100.0 | 100.0 | 100.0 | 100.0 | 100.0 | 100.0 |
| | zinc acrylate | 25.0 | 25.0 | 25.0 | 25.0 | 35.0 | 25.0 |
| | zinc oxide | 22.4 | 27.5 | 19.2 | 21.0 | 17.4 | 21.0 |
| | diphenylsulfide | 0.5 | 0.5 | 0.5 | 0.5 | 0.5 | 0.5 |
| | dicumyl peroxide | 1.0 | 1.0 | 1.0 | 1.0 | 1.0 | 1.0 |
| | SHP (LA1060)[2] | 5.0 | 22.0 | — | — | — | — |
| composition of intermediate layer | BR10[3] | — | — | 100.0 | — | — | — |
| | magnesium methacrylate | — | — | 25.0 | — | — | — |
| | magnesium oxide | — | — | 23.0 | — | — | — |
| | dicumyl peroxide | — | — | 2.0 | — | — | — |

TABLE 1-continued

|  |  |  | ex. 1 | ex. 2 | ex. 3 | comp. ex. 1 | comp. ex. 2 | comp. ex. 3 |
|---|---|---|---|---|---|---|---|---|
|  | SHP (LA1060) |  | — | — | 5.0 | — | — | — |
| condition for molding | condition for vulcanization |  | 170° C. for 15 min. | 170° C. for 15 min. | 150° C. for 25 min. + 165° C. for 8 min. | 170° C. for 15 min. | 170° C. for 15 min. | 140° C. for 25 min. + 165° C. for 8 min. |
| physical properties of core | hardness distribution | 0 mm (Hc) | 56 | 57 | 66 | 55 | 65 | 78 |
|  |  | 5 mm | 70 | 71 | 72 | 69 | 75 | 78 |
|  |  | 15 mm | 76 | 77 | 77 | 76 | 81 | 78 |
|  |  | surface (Hs) | 80 | 80 | 80 | 80 | 85 | 78 |
|  | diff. in hardness distribution (Hs-Hc) |  | 24 | 23 | 14 | 25 | 20 | 0 |
|  | deformation under compression (mm) |  | 4.1 | 3.9 | 4.0 | 4.2 | 2.6 | 3.9 |
| composition of cover | Hi-milan #1605 |  | 100 | 100 | 100 | 100 | 100 | 100 |
|  | titanium oxide |  | 3 | 3 | 3 | 3 | 3 | 3 |
| estimation of ball | feel |  | ◯ | ◯ | ◯ | ◯ | X | X |
|  | durability |  | 134 | 119 | 125 | 100 | 127 | 129 |

Blended components indicated in Table 1 are as follows:
1) BR18: high cis polybutadiene rubber of JSR corporation.
2) SHP (JA1060): ternary composite of rubber, polyolefin and nylon of Yamato Polymer Co., Ltd.
3) BR10: high cis polybutadiene rubber onomer resin of JSR corporation.

(2) Preparation of Composition for Cover

The cover composition shown in Table 2 was mixed using a twin-shaft kneading-type extruder and extruded by the twin-shaft extruder at a cylinder temperature of 180° C. The cover is formed using Hi-milan #1605 (ionomer resin of Du Pont-Mitsui Polychemicals Co., Ltd.).

The cover composition of Table 1 was injection-molded and arranged to cover a solid core. It then had a surface painted to produce a golf ball having a diameter of 42.7 mm and weight of 45.4 g.

Third Example

The rubber compound of the core blended as shown in Table 1 was used to produce a solid core, as described in the first example. The solid core had a diameter of 37.1 mm. The rubber compound indicated in Table 1 was then used to be vulcanized and molded at 150 degrees centigrade for 25 minutes and then at 165 degrees centigrade for 8 minutes to obtain a pair of semispherical intermediate layers of 0.5 mm in thickness. The pair of semispherical intermediate layers was arranged to cover the solid core to obtain a structure formed of the core and the intermediate layer and having a diameter of 38.1 mm. Then, as described in the first example, the structure was covered with a cover to obtain a golf ball.

Performance Estimation

The obtained golf ball was estimated in durability, and feel at impact.

(1) Durability

A swing robot of True Temper Sports with a metallic wood, a club no. 1 (W#1 driver) attached thereto, set to provide a head speed of 45 m/sec, was used to hit each golf ball to impinge on a plate for estimation. The estimation was made by how many times the ball was hit before it was destroyed, and it was provided in the form of an index, as compared with the first comparative example, which corresponds to an index of 100. If the ball provides a larger index it has more excellent durability.

(2) Feel at Impact

Each ball was hit by ten golfers with a metallic wood, a club no. 1 (W#1 driver). Feel at impact was estimated in accordance with the following criterion:
◯: excellent, with small impact
Δ: good
X: unsatisfactory, with large impact and the estimation for the ball that has been made by the most of the golfers was selected as the feel at impact for the ball.

Table 1 shows the estimations of the golf balls of the first to third examples and the first to third comparative examples.

Results of Estimation

The first to third comparative examples, using a core of a rubber compound without a ternary composite blended, provided a rather uncomfortable feel.

In the first and second examples a rubber compound formed of polybutadiene rubber with a ternary composite blended therewith was used for the core, and in the third example a rubber compound formed of polybutadiene rubber with a ternary composite blended therewith was used for the intermediate layer. The balls all provided durability and feel improved in a good balance.

The present golf ball at its core and/or intermediate layer in particular or in the form of a one-piece ball can be formed of a compound provided by a mixture of a polymer component and a ternary composite. The present golf ball can be improved in both durability and feel.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A golf ball comprising a core and a cover surrounding said core, wherein said core contains a polymer component and a ternary composite having a rubber component, a polyolefin component and a nylon component, wherein the range of the polyolefin component is 40 to 100 parts by mass, and wherein the range of the nylon component is from 87 to 105 parts by mass, based on 100 parts by mass of the rubber component for the ternary composite.

2. The golf ball of claim 1, wherein said polymer component is selected from the group consisting of a rubber, a thermoplastic resin, a thermoplastic elastomer, an ionomer resin and mixture thereof.

3. The golf ball of claim 1, wherein the rubber component is selected from the group consisting of natural rubber, polyisoprene, ethylene-propylene-diene rubber, nitrile-butadiene rubber, and hydrogenated nitrile-butadiene rubber.

4. The golf ball of claim 1, wherein the polyolefin component is selected from the group consisting of low-density polyethylene, high-density polyethylene and polypropylene.

5. The golf ball of claim 1, wherein the nylon component is selected from the group consisting of nylon 6, nylon 66, nylon 11, and nylon 12.

6. The golf ball of claim 1, wherein the rubber component is selected from the group consisting of natural rubber, polyisoprene, ethylene-propylene-diene rubber, nitrile-butadiene rubber, and hydrogenated nitrile-butadiene rubber; wherein the polyolefin component is selected from the group consisting of low-density polyethylene, high-density polyethylene and polypropylene; and wherein the nylon component is selected from the group consisting of nylon 6, nylon 66, nylon 11, and nylon 12.

7. The golf ball of claim 1, wherein the rubber component is ethylene-propylene-diene rubber; wherein the polyolefin component is polypropylene; and wherein the nylon component is nylon 6.

8. The golf ball of claim 1, wherein in the matrix of the ternary composite, the polyolefin component forms a continuous phase.

9. The golf ball of claim 1, wherein the amount of ternary composite blended with the polymer component is in a range of 1–30 parts by mass with respect to 100 parts by mass of the polymer component.

10. The golf ball of claim 1, wherein the amount of ternary composite blended with the polymer component is in a range of 5–20 parts by mass with respect to 100 parts by mass of the polymer component.

11. A golf ball comprising a core, an intermediate layer arranged over said core, and a cover arranged to cover said intermediate layer, wherein said core and/or said intermediate layer comprises a polymer component and a ternary composite having a rubber component, a polyolefin component and a nylon component, wherein the range of the polyolefin component is 40 to 100 parts by mass, and wherein the range of the nylon component is from 87 to 105 parts by mass, based on 100 parts by mass of the rubber component for the ternary composite.

12. The golf ball of claim 11, wherein the rubber component is selected from the group consisting of natural rubber, polyisoprene, ethylene-propylene-diene rubber, nitrile-butadiene rubber, and hydrogenated nitrile-butadiene rubber.

13. The golf ball of claim 11, wherein the polyolefin component is selected from the group consisting of low-density polyethylene, high-density polyethylene and polypropylene.

14. The golf ball of claim 11, wherein the nylon component is selected from the group consisting of nylon 6, nylon 66, nylon 11, and nylon 12.

15. The golf ball of claim 11, wherein the rubber component is selected from the group consisting of natural rubber, polyisoprene, ethylene propylene-diene rubber, nitrile-butadiene rubber, and hydrogenated nitrile-butadiene rubber; wherein the polyolefin component is selected from the group consisting of low-density polyethylene, high-density polyethylene and polypropylene; and wherein the nylon component is selected from the group consisting of nylon 6, nylon 66, nylon 11, and nylon 12.

16. The golf ball of claim 11, wherein the rubber component is ethylene-propylene-diene rubber; wherein the polyolefin component is polypropylene, and wherein the nylon component is nylon 6.

17. The golf ball of claim 11, wherein the amount of ternary composite blended with the polymer component is in a range of 1–30 parts by mass with respect to 100 parts by mass of the polymer component.

18. The golf ball of claim 11, wherein the amount of ternary composite blended with the polymer component is in a range of 5–20 parts by mass with respect to 100 parts by mass of the polymer component.

* * * * *

UNITED STATES PATENT AND TRADEMARK OFFICE
CERTIFICATE OF CORRECTION

PATENT NO. : 7,172,520 B2  
APPLICATION NO. : 10/318239  
DATED : February 6, 2007  
INVENTOR(S) : Kazuhisa Fushihara et al.

It is certified that error appears in the above-identified patent and that said Letters Patent is hereby corrected as shown below:

On the title page: Item

"(30)   Foreign Application Priority Data

Dec. 14, 1920 (JP).......2001-381499"

Should read:

--(30)   Foreign Application Priority Data

Dec. 14, 2001 (JP)...........2001-381499--

Signed and Sealed this

Nineteenth Day of June, 2007

JON W. DUDAS  
*Director of the United States Patent and Trademark Office*